United States Patent
Cornwell et al.

[11] Patent Number: 5,837,945
[45] Date of Patent: Nov. 17, 1998

[54] REFUSE WEIGHING SYSTEM AND METHOD

[75] Inventors: David M. Cornwell, Escondido; David A. Ness, San Diego, both of Calif.

[73] Assignee: Hardy Instruments, Inc., San Diego, Calif.

[21] Appl. No.: 639,904

[22] Filed: Apr. 24, 1996

[51] Int. Cl.$^6$ ............ G01G 19/08; G01G 19/40; G01G 23/18
[52] U.S. Cl. ............ 177/136; 177/25.14; 177/139; 177/45
[58] Field of Search ................ 177/136, 145, 177/25.14, 139, 45

[56] References Cited

U.S. PATENT DOCUMENTS

| | | | |
|---|---|---|---|
| 4,323,132 | 4/1982 | Bradley | 177/139 |
| 4,421,186 | 12/1983 | Bradley | 177/139 |
| 4,486,136 | 12/1984 | Howard | 414/21 |
| 4,714,122 | 12/1987 | Appleton et al. | 177/139 |
| 4,771,837 | 9/1988 | Appleton et al. | 177/139 |
| 4,809,794 | 3/1989 | Blair et al. | 177/139 |
| 4,815,547 | 3/1989 | Dillon et al. | 177/25.14 |
| 4,854,406 | 8/1989 | Appleton et al. | 177/139 |
| 4,917,197 | 4/1990 | Waite, Jr. | 177/137 |
| 4,919,222 | 4/1990 | Kyrtsos et al. | 177/139 |
| 5,038,876 | 8/1991 | Smith | 177/139 |
| 5,119,894 | 6/1992 | Crawford et al. | 177/145 |
| 5,161,628 | 11/1992 | Wirth | 177/137 |
| 5,178,226 | 1/1993 | Bowman et al. | 177/139 |
| 5,209,313 | 5/1993 | Brodrick et al. | 177/139 |
| 5,230,393 | 7/1993 | Mezey | 177/139 |
| 5,245,137 | 9/1993 | Bowman et al. | 177/139 |
| 5,285,860 | 2/1994 | Wirth | 177/139 |
| 5,313,023 | 5/1994 | Johnson | 177/229 |
| 5,347,092 | 9/1994 | Buchs et al. | 177/212 |
| 5,391,844 | 2/1995 | Johnson et al. | 177/229 |

FOREIGN PATENT DOCUMENTS

| | | |
|---|---|---|
| 0402352 | 6/1990 | European Pat. Off. . |
| 0452821 | 4/1991 | European Pat. Off. . |
| 0496166 | 7/1992 | European Pat. Off. . |
| 0521847 | 1/1993 | European Pat. Off. . |
| 264755 | 2/1989 | Germany . |
| 3819169 | 12/1989 | Germany . |

*Primary Examiner*—Hezron E. Williams
*Assistant Examiner*—Randy W. Gibson
*Attorney, Agent, or Firm*—Brown, Martin, Haller & McClain, LLP

[57] ABSTRACT

A weighing system for determining the weight of material deposited from a container into a collection truck for collecting refuse or recyclable material includes at least one load cell installed into a lifting fork of the truck lifting arm for producing output signals based on the load on the arm as the full container is lifted and the emptied container is lowered. An acceleration or angle sensor is also provided on the lifting arm for sensing the acceleration or angle of the arm and producing a corresponding output signal. A processing unit receives the load cell and sensor outputs during raising and lowering of the lifting arm, and calculates the dynamic weight of the refuse lifted and deposited from the container, using the sensor output to compensate for the angle or G forces on the arm.

36 Claims, 7 Drawing Sheets

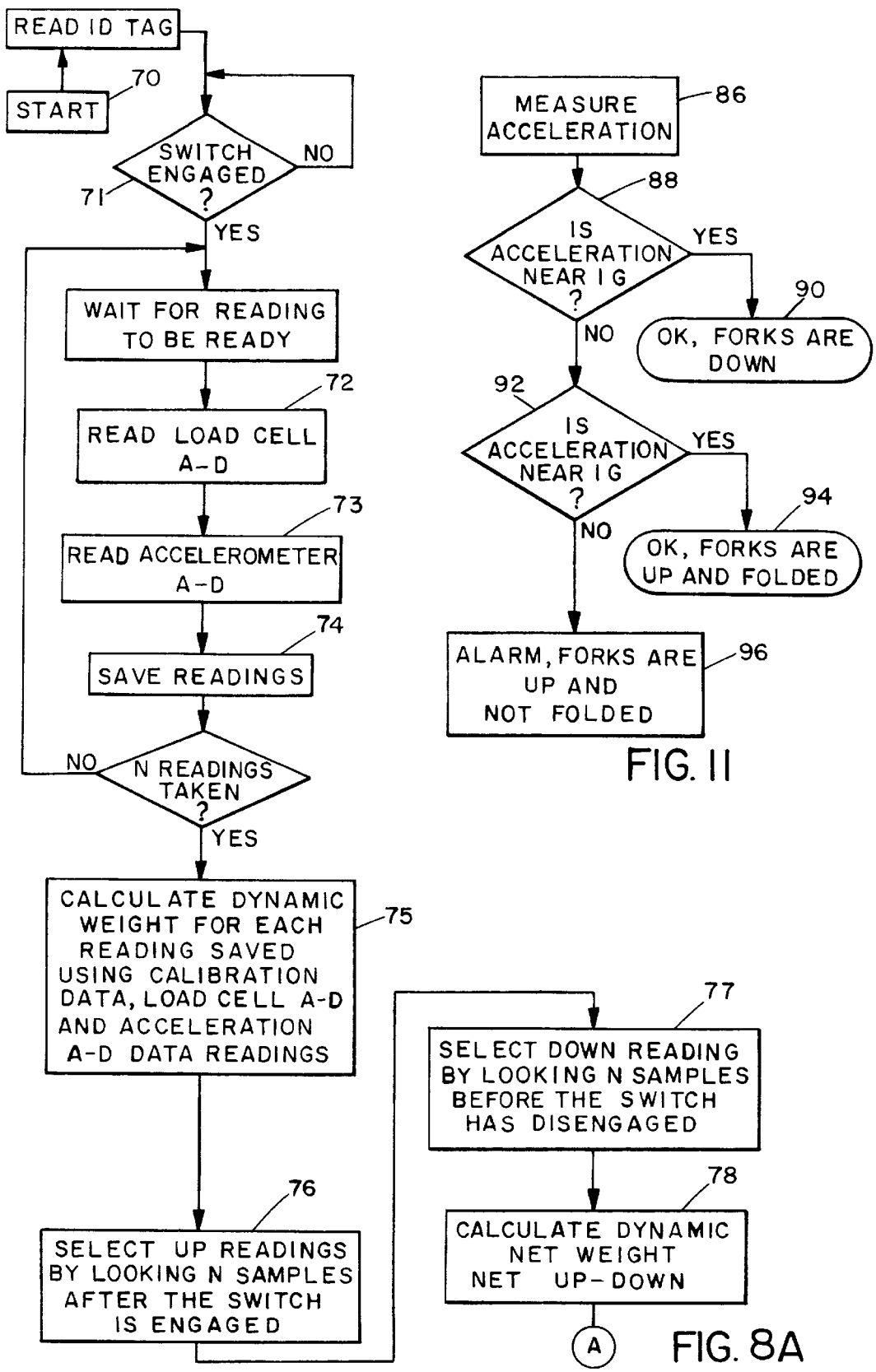

5,837,945

REFUSE WEIGHING SYSTEM AND METHOD

BACKGROUND OF THE INVENTION

The present invention relates to a weighing system and method for weighing refuse or recyclable material as it is collected by a refuse or recycling truck.

Currently, customers pay a fixed fee for refuse collection regardless of the amount of refuse collected. This is not ideal for either the refuse collector or the customer, for a number of reasons. Firstly, the refuse collector is charged a dumping fee at a landfill based on the weight of refuse dumped. Additionally, more trips will be required to the landfill if a greater amount of refuse is collected. Thus, the costs to the refuse collector are largely dependent on the amount of refuse collected. Customers also often feel that it is unfair to charge them the same rate when others may leave a much greater amount of refuse for collection. Another aspect is the desirability of motivating customers to separate out recyclable material from their refuse. Clearly, the motivation would be substantially greater if they could thereby reduce their refuse collection bill. Thus, there is currently a great demand for a system which will permit charging of customers for refuse collection based on the weight of refuse collected. If the weight of both refuse and recyclable material can be effectively and accurately weighed as it is collected, and the weight recorded during curbside collection, customers can be fairly billed based on the weight of refuse collected, and can be credited for recycling appropriate materials.

A number of weighing systems have been proposed in the past for installation on refuse trucks in order to achieve these objectives. However, these systems have been subject to various problems, and no system has been provided as yet which is sufficiently accurate and efficient for billing on the basis of weight collected. Conventional refuse trucks have some type of automatic lifting system for lifting a refuse container from the curb, and raising and inverting the container over a collection area in the truck into which the refuse is dumped. The emptied container is then lowered back to the curb. In these systems, the container is weighed as it is lifted and again as it is lowered, with the difference between the two weights providing an indication of the amount of refuse or recyclable material deposited in the truck. However, there are a number of problems in accurately weighing a container as it is lifted by a trash truck. The truck may be positioned on an incline, which will affect the weight reading. The truck engine is normally running while the container is lifted, and the lifting system itself will affect the weight sensed, due to vibration, acceleration and other variables. Additionally, the contents of the container are liable to shift during lifting, causing more variations in the detected weight. Because of this, some systems in the past have proposed stopping the lifting device while the container is being emptied, once during the up cycle and once during the down cycle. However, this will increase the amount of time needed to collect refuse and decrease efficiency. Additionally, other variables such as truck inclination and engine vibration will still cause variation in the detected load.

In U.S. Pat. No. 5,119,894 of Crawford et al., a weighing apparatus for a refuse truck is described which weighs the load while the load is in motion. Weigh beams are secured between the lifting device and a stationary support to sense the weight of the load continuously. The detected weights are collected and stored at predetermined intervals. A position sensor is used to detect a predetermined position of the lifting device during each lifting cycle and lowering cycle. Only those weights which are detected during the lowermost portion of each cycle, when the movement is more or less vertical, are used in performing the weight calculation, since the contents of the container will be less likely to have shifted during this portion of the lifting. However, this system is still subject to inaccuracy due to acceleration and deceleration of the lifting device, vibration of both the truck and the lifting device, and the measured weight will also vary if the truck is parked on an incline.

U.S. Pat. No. 4,714,122 of Appleton et al. describes another weighing system for a refuse truck, in which a transducer or load cell is installed on the lifting arm and the output of the load cell is collected at a predetermined point as the container is lifted, and again at the same point as the container is lowered. This system will be subject to similar inaccuracies. Other systems have proposed measuring weight based on the fluid pressure in the hydraulic lifting cylinders. However, factors such as acceleration, position and shifting of the center of gravity of the weight being lifted, temperature and pressure variations, may cause variations in the calculated weight.

Thus, there is still a need for a system which Can take into account the various factors which will cause a variation in the detected weight, and provide an accurate indication of the actual weight of the refuse container and refuse. Such a system is essential if customers are to be billed based on weight of refuse collected.

SUMMARY OF THE INVENTION

It is an object of the present invention to provide a new and improved refuse weighing system and method for refuse collection, which can provide accurate data on the weight of refuse collected at each collection location.

According to one aspect of the present invention, a refuse weighing system is provided which comprises a lifting device for engaging a refuse container containing refuse and lifting the container to deposit the refuse into a receptacle, and then lowering the emptied container to the ground, the lifting device having at least one lifting arm and a load cell incorporated into the lifting arm, the load cell having an output proportional to the load carried by the arm, an acceleration sensor on the lifting arm for sensing the acceleration of the arm and having an output proportional to the acceleration, and a processing unit connected to the load cell and acceleration sensor outputs for receiving outputs as the lifting arm is raised and lowered and for calculating the dynamic weight of the refuse lifted and deposited from the container from the outputs of the load cell and sensor.

Preferably, the load cell and acceleration sensor outputs are filtered to remove noise before connection to the processing unit. The outputs are converted from analog to digital signals, and the digitized signals are then filtered prior to being input to the processing unit. Preferably, load cell and accelerometer outputs are provided at predetermined intervals during the entire lifting and lowering process, and the processing unit utilizes only readings during a predetermined part of the cycle. Typically, when a refuse truck engages and begins to lift a refuse container, the motion will be jerky and the acceleration will be relatively high. When the arm has reached an inclination of around 20° to 40°, the acceleration and G forces will drop off and the motion will become more smooth. It is preferable to measure the dynamic weight during the smooth portion of the lifting cycle when the force is at around 1 G. The accelerometer output may be used to determine when this condition exists, and the load cell outputs from this portion of the lifting cycle are then used to determine dynamic weight of the container and its contents. Similarly, during the lowering cycle, the initial downward movement will be non-smooth. The movement will then become relatively smooth until the arms start to decelerate to ensure that the emptied container is lowered slowly to the ground to avoid damage. Again, the accelerometer output is used to determine the G forces, and the processor unit uses only the load cell outputs from that portion of the lowering cycle where the G forces are close to 1 G.

In some cases, where the operator raises and lowers the arm at a very slow speed, the 1 G condition may not be achieved. For this reason, a switch is installed at the lifting arm pivot to be actuated when the lifting arm is at an angle of about 40° during the lifting cycle, and turned off at the same position during the lowering cycle. Load cell readings after actuation of the switch in the lifting cycle and prior to disengagement of the switch in the lowering cycle are used to determine the dynamic weight. The switch is actuated at a point in the lifting cycle when the motion is normally relatively smooth, and is disengaged in the lowering cycle at a point after which deceleration will normally commence.

Preferably, where the lifting arm comprises a pair of forks which engage a refuse container on opposite sides, two load cells are used and each load cell is installed along the length of a respective one of the forks by cutting the fork at an intermediate position in its length and installing the load cell between the cut ends. This ensures a very accurate measurement of the load carried by the forks. An accelerometer may be embedded in each load cell, or installed on the lifting arm at approximately the same distance from the pivot point of the lifting arm as the load cells, to ensure that it is measuring the same G forces as the load cells.

In a preferred embodiment of the invention, each trash container will have a unique radio frequency identification tag and the refuse weighing system also includes a tag reader for reading the tag as the container is lifted. The tag identification is provided to the processing unit along with the load cell and sensor outputs, and is stored along with the calculated weight of trash deposited. Preferably, the processing unit is also connected to a display unit in the driver's cab of the trash truck so that the driver can see the weight. As the truck is driven around a trash collection route, the identity of each customer along with the weight of trash collected from that customer is processed and stored, preferably in a removable data storage medium such as a computer memory disk or card. At the end of the route, this information can be transferred to a host computer so that customers may be billed according to the weight of trash collected. Alternatively, the collected data may be transferred via a radio link to the host computer. The truck driver may also enter information into the system, such as the identification of damaged trash containers or cans, so that these can be repaired or replaced as necessary.

In this system, the trash can or container can be weighed while the trash can is in motion, without needing to stop the lifting arms each time a weight reading is taken. Thus, the time taken to collect trash is not increased. The use of an accelerometer to measure G forces and acceleration forces enables compensation for the effects of such forces on the load cell output, so that an accurate weight can be measured even while the trash can is in motion upwardly or downwardly. Additionally, the system is controlled to make weight measurements only during a part of the lifting and lowering cycle in which the movement is relatively smooth and, preferably, the G forces are close to 1 G. Filtration of the load cell and acceleration sensor outputs also helps in removing errors due to truck vibration. Thus, the weight can be measured with sufficient accuracy to be used for customer billing practices, without slowing down the rate of trash collection.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which:

FIG. 11 is a block diagram of the fork action detection;

DESCRIPTION OF THE PREFERRED EMBODIMENTS

Figure 1:
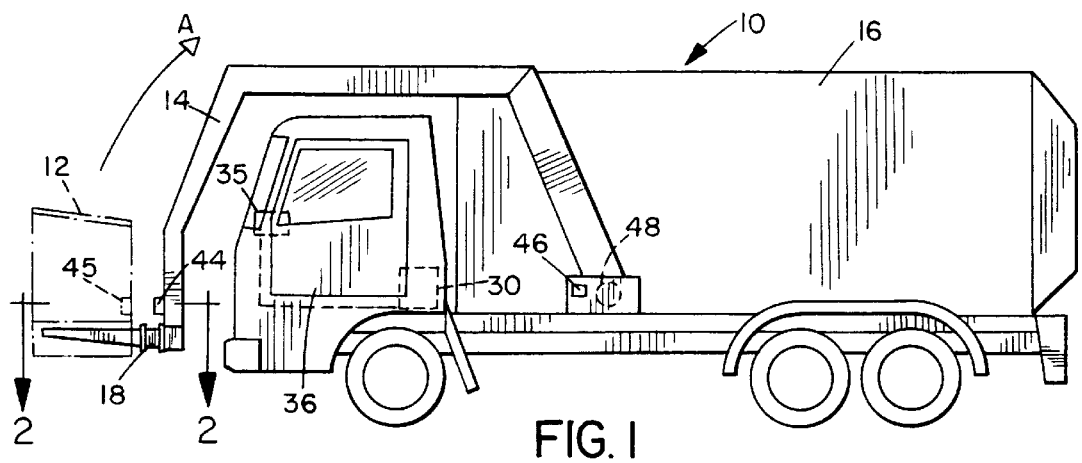
FIG. 1 is a side elevation view of a typical front loading refuse collection vehicle incorporating a weighing system according to a preferred embodiment of the present invention.

FIG. 1 illustrates a front end loader type of trash truck 10 incorporating a weighing system according to a preferred embodiment of the present invention. The truck 10 is adapted to pick up a trash can or container 12 on lifting arm 14, raise the container upwardly in the direction of arrow A over the top of the truck, and invert the container 12 over an opening in the body 16 of the truck in a conventional manner. The emptied container is then lowered back to the ground.

Figure 2:
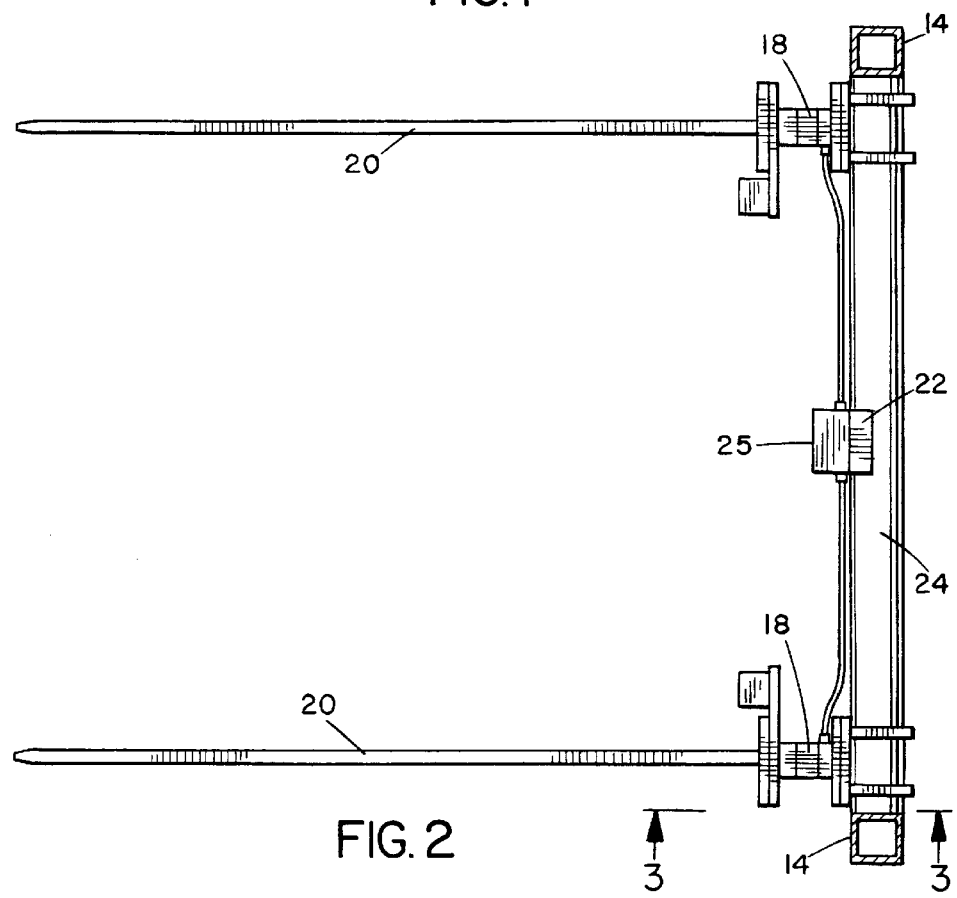
FIG. 2 is an enlarged sectional view taken on line 2—2 of FIG. 1.
Figure 3:
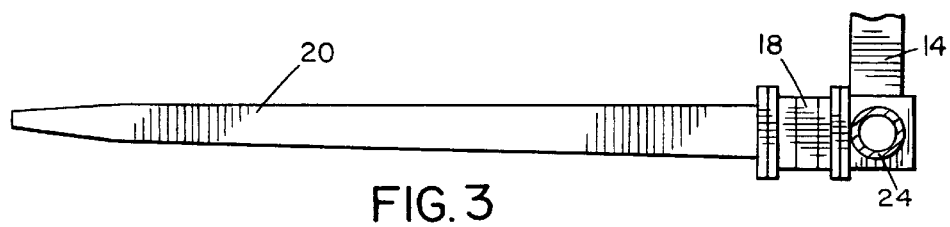
FIG. 3 is a sectional view taken on line 3—3 of FIG. 2.
Figure 6:
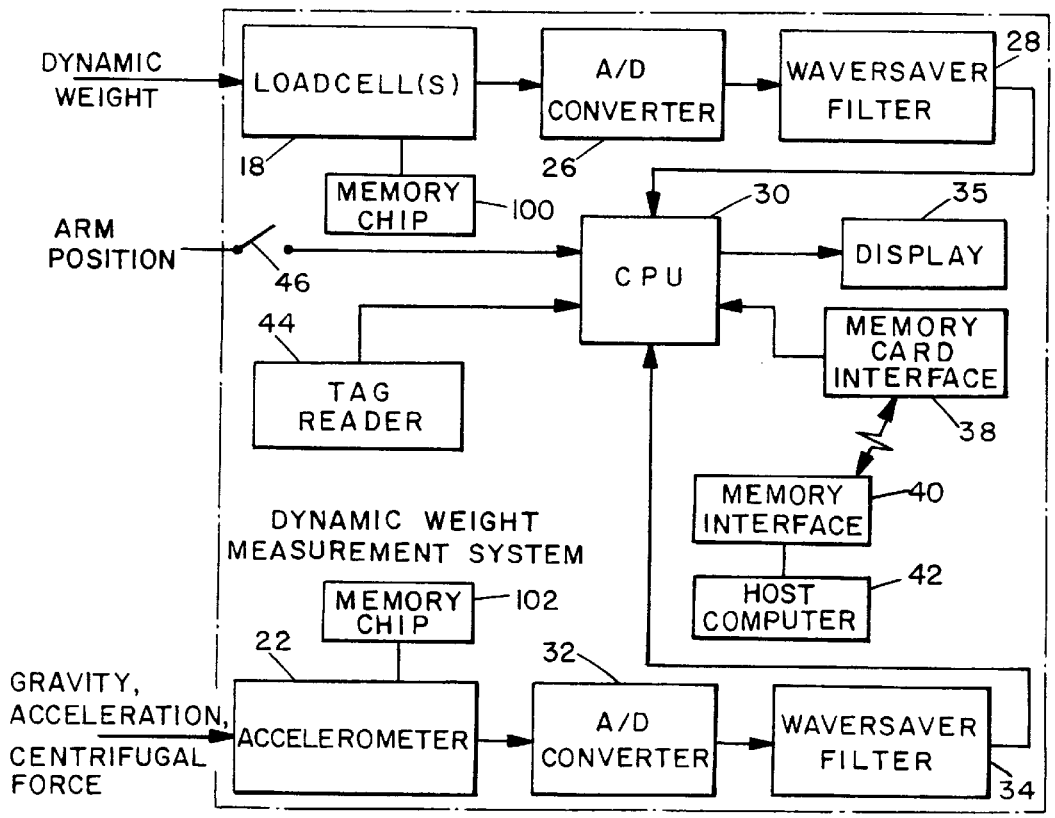
FIG. 6 is a block diagram of the dynamic weight measurement system.

The weighing system includes a pair of load cells 18, each of which is installed in a respective one of the forks 20 of lifting arm 14, as best illustrated in FIG. 2, and an accelerometer 22 installed at the center of cross tube 24 of the forks. The output of each load cell is connected to a summing junction box 25 also located at the center of cross tube 24. As best illustrated in FIG. 6, the output of load cells 18 is connected via analog to digital converter 26 and a filter 28 for removing vibration to the input of a central processing unit or computer 30. The output of accelerometer 22 is also connected to an analog to digital converter 32, the output of which is connected via filter 34 to processing unit 30. The computer 30 also has a display output connected to a display unit 35 which is preferably located in the driver's cab 36, as best illustrated in FIG. 1. The computer includes a memory unit 38 with a removable memory card or disk on which computed weights from each collection site can be stored.

The disk can be removed from unit 38 at the end of a collection route and inserted in a memory unit 40 of a host computer 42 of the waste collection company for billing and data storage. Alternatively, or additionally, each trash truck may be linked to the host computer via a wireless communication system, in which case the collected weights can be transferred to the host computer via the wireless communication system.

The system also includes a radio identification tag reader 44 installed at an appropriate height on lifting arm 14 or cross-tube 24 for reading a radio frequency identification tag 45 attached to each trash container 12. Reader 44 is also connected to the central processing unit 30. Additionally, a switch 46 is mounted on the truck adjacent the lifting arm pivot 48. A suitable cam device is mounted on the pivot 48 for actuating the switch 46 at a predetermined position in the lifting cycle, as will be explained in more detail below. The switch 46 is also connected to the central processing unit 30 as indicated in FIG. 6.

Figure 4:
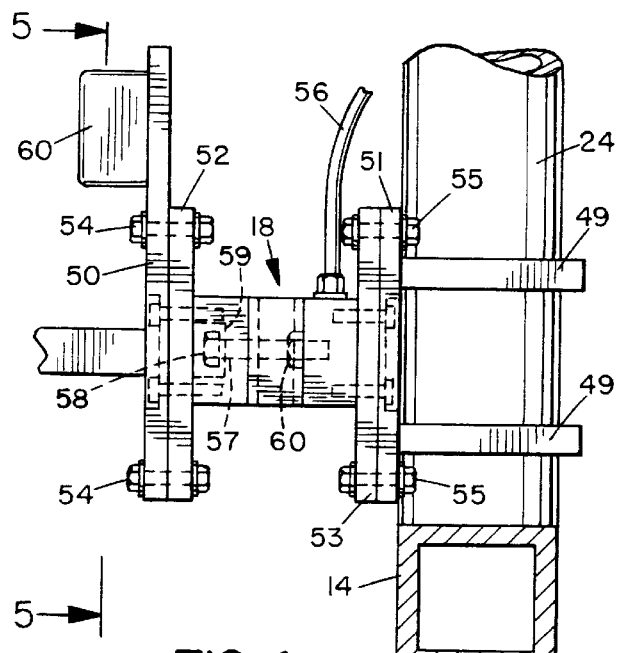
FIG. 4 is an enlargement of the lower portion of FIG. 2.
Figure 5:
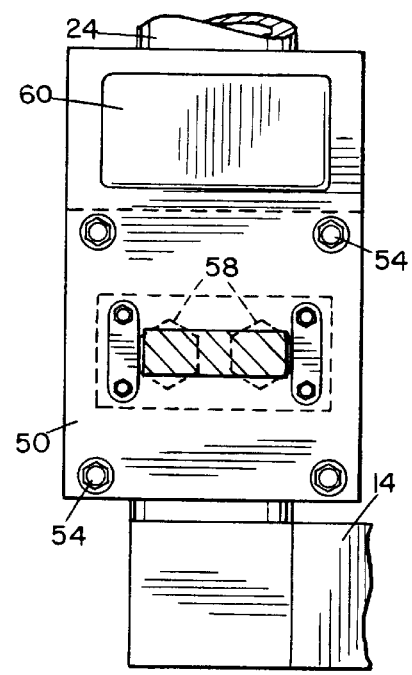
FIG. 5 is a sectional view taken on line 5—5 of FIG. 4.

The installation of each load cell 18 on the respective lifting fork 20 is best illustrated in FIGS. 4 and 5. Each load cell 18 is secured between the cross bar mounting brackets 49 and the inner end of the respective fork. A first mounting plate 50 is secured to the end of each fork, and a second mounting plate 51 is secured to mounting brackets 49, as best illustrated in FIG. 4. Mounting plates 52,53 are bolted to the opposite ends of each load cell as illustrated. Mounting plate 50 is secured to plate 52 by bolts 54, while mounting plate 51 is secured to plate 53 with bolts 55. The load cell 18 is of the bending beam type with relatively thin metal beams spanning an internal cavity, which may house additional beams or shear beams. Deflection of the load cell will occur as a result of load on the forks, and an output signal proportional to the load will be produced on output line 56.

A pair of overload bolts 57 extend between the opposite ends of the load cell across the cavity, and provide an added safety measure against the forks shearing or breaking at the load cell as a result of shock loads, for example. The head 58 of each bolt is seated in recess 59 which is larger than the bolt, and the shaft extends through a bore in the body of the load cell with some free play, with the threaded end engaging in a corresponding threaded bore in the opposite end plate, and secured in place by locking nut 60. The gap between the head 58 and shaft and the body of the load cell allows for deflection of the load cell for loads up to around 10,000 lbs. The overload bolts will engage the end plate at loads between 10,000 and 17,500 lbs, providing a strong, rigid joint between the opposite end plates. At this point, the load will be carried by the overload bolts, ensuring that the forks will not shear off in the event that excessive shock loads are encountered. A resilient bumper pad 60 is preferably mounted on the outwardly facing side of each end plate 50, to reduce the risk of impacts damaging the load cell.

The accelerometer is mounted at approximately the same distance from the pivot 48 as the two load cells, so that it measures the same acceleration and G forces as are encountered by the load cells. If desired, accelerometers may alternatively be incorporated into the load cell body. However, sufficient accuracy is provided by mounting an accelerometer on the junction box as illustrated in FIG. 2. Operation of the system to measure the weight of trash deposited from a container 12 will now be described in more detail with reference to FIGS. 7–10. The switch is positioned such that it will be actuated by a cam at the point where the forks are oriented at an angle of approximately 40°. The switch will be deactivated when the forks reach the same position as the empty can is being lowered back to the ground. This will produce a pulse output as illustrated in FIG. 10, which may be used to determine the point at which load readings should be taken and used in the weight calculation. However, this determination is preferably made by calculating the position at which the acceleration is closest to 1 G. In practice, as a trash can or container is engaged and the system is actuated to begin to lift the forks, there will be an acceleration spike of the order of 3–4 G as the forks jerk up from the ground. After this, the acceleration becomes more smooth. A similar deceleration spike occurs as the can is lowered. In each case, it is preferable to measure the load when the fork motion is as smooth as possible and the acceleration or deceleration is close to ±1 G.

As a trash can is engaged by the forks, the RF ID tag 45 will be read by reader 44 and this information will be stored by the computer. The host computer contains stored data on customer names and addresses associated with each RF ID tag. Preferably, at the start of each day, each truck will be assigned a route for trash pickups that day, and the names, addresses and RF ID tags for that route will be transferred to the truck computer by a memory card or by radio link. As the can 12 is lifted, the total weight of the can and trash will be computed based on the outputs of the load cells and accelerometer, as will be explained in more detail below. The can is then inverted over the trash receiving opening in the top of the truck, and the trash will fall out of can 12 and into the truck. The empty can is lowered to the ground, and while it is being lowered the weight of the empty can is measured. The weight of material dumped is then computed by subtracting the second weight from the first weight. The truck computer records the weight of material dumped, the trash can RF ID number, and the time. The computer keyboard at the driver display panel is preferably provided with a "damaged can" button which the driver can actuate if he or she observes a trash can is damaged. In this way, a record of damaged cans is provided so that they can be readily repaired and replaced by the collection company.

At the end of the day, the data collected is transferred to the host computer, either via a memory card or disk or by radio link. The weight collected at each location can be used to bill the customer according to weight of trash collected, which is preferable since landfills typically charge waste collection companies based on the weight of trash dumped.

The load sensing and computation of the actual weight of trash collected from each customer will now be described in more detail. The accelerometer measures the G level and other forces that the load cells encounter while the system is in motion, so that the weight computation can compensate for these forces and measure the actual weight lifted by the forks. Any suitable accelerometer may be used, such as the ADXL05 accelerometer made by Analog Devices. Although a single accelerometer is used in the described embodiment, more than one accelerometer may be used, and the vector sum of the accelerometer outputs may then provide a more accurate result. Initially, the system will be calibrated in order to determine the dead load of the forks and the load cells, which is the static dead load, i.e. the dead load at 1 G (forks horizontal). The load cell output will vary with angle of the forks, in other words the static dead load will change as the forks tilt up. The load will reduce as the forks tilt. Calibration readings are taken for the static dead load at each fork angle. In addition to this variable, a constant, K, is determined for compensating for the effect of the speed of the forks. This constant will vary from truck to truck, and calibrations are carried out to compute the optimum K value to best match the weighing system.

Figure 7:
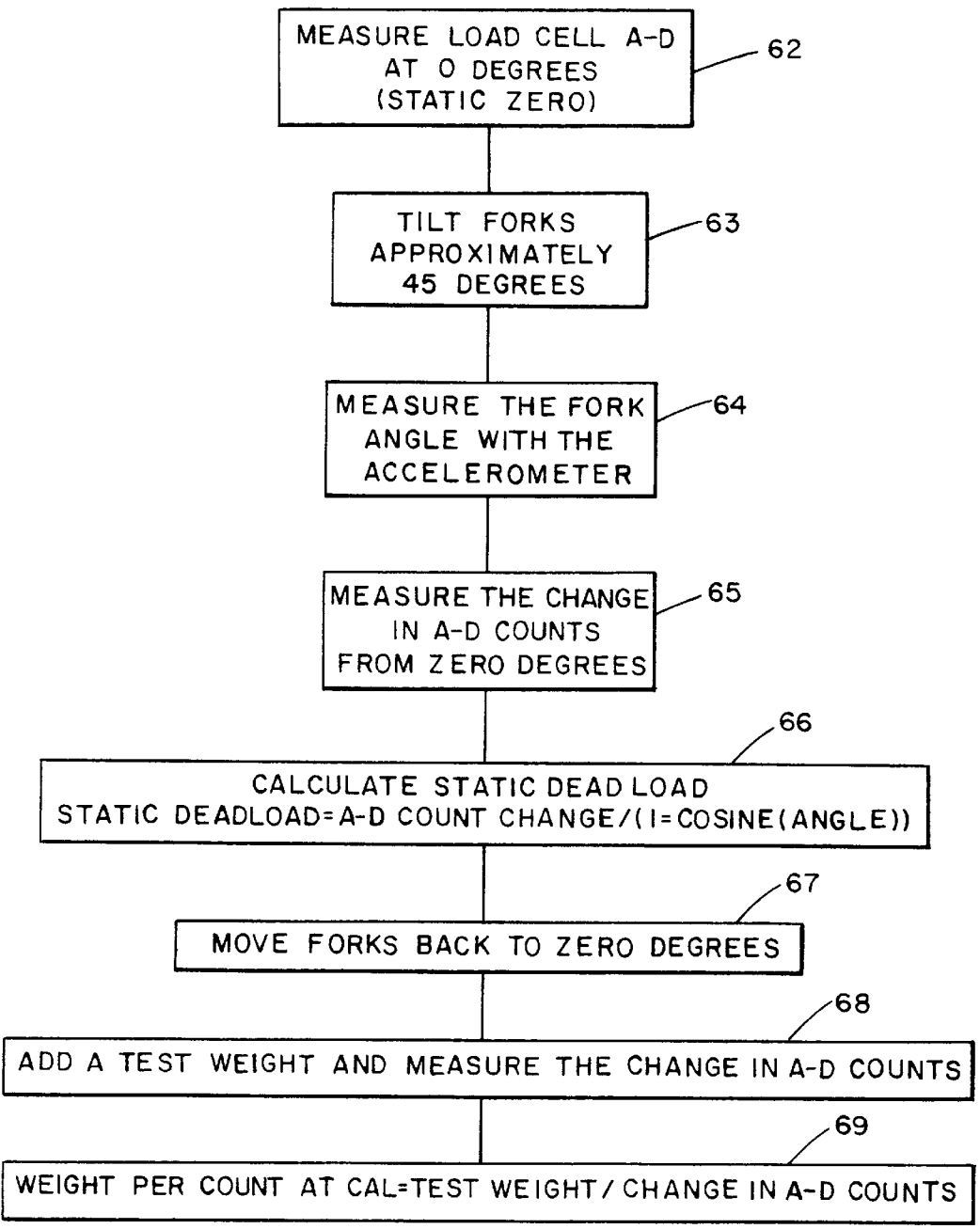
FIG. 7 is a flow diagram of the calibration procedure.

FIG. 7 illustrates the calibration procedure carried out on installation of the load cells. After calibration, the calibration values are stored in the truck computer for subsequent use in each weight computation, as described in more detail below with reference to FIG. 9. First, the load cell A-D counts at 0° are measured at step 62. The load cell is adjusted to 0° with no load on the forks. The resultant count value is the Static Zero calibration reading, which is stored for future use. Next, the forks are tilted to an angle of around 45° (step 63). In practice, any angle may be used, but a larger angle will give less error. The fork angle is then measured using the accelerometer (step 64). The change in the A-D output of the load cells at 0° and 45° is then calculated (step 65). The Static Dead Load is then calculated as follows:

$$\text{Static dead load} = \frac{\text{Change in } A - D \text{ counts between steps 62 and 65}}{1 - \cos(\text{angle})} \quad (1)$$

where the angle is measured at step 64. This provides a measure of the change in A-D counts with angle at zero load.

Even with no external weight applied, the load cells have an output due to the dead load weight of the forks, mounting brackets, and the half of each load cell located on the live or loaded side. This weight is needed in order to correctly calculate the applied weight at any angle, and is the Static Dead Load which will be stored in the truck computer for use in subsequent weight computations. The output of the load cell at an angle is defined as:

Load cell output = Load cell output at zero angle and (2)

no applied weight and no dead weight + cos(angle) *

(applied weight + dead weight).

Both the load cell output at zero and the dead weight are already known from previous computations and are equal to Static Zero and Static Dead Load, respectively. Thus, in order to solve the foregoing equation to determine the weight applied to the forks, the load cell output and the angle of the forks are the only variables which need to be known. Since G level will be dependent on fork angle, the detected G level can be used to adjust the load cell output for fork angle.

Once the Static Dead Load has been determined, the forks are moved back to zero degrees (67). A test weight is then applied to the forks, and the change in the load cell counts is measured between steps 62 and 68. In the next step (69), the Weight per count at cal is calculated as follows:

$$\text{Weight per count at cal} = \frac{\text{Test Weight}}{\text{Change in } A - D \text{ counts between steps 62 and 68}} \quad (3)$$

This value is also stored. This value is used during each weight measurement to change the A-D counts read to a corresponding weight value.

The accelerometer output is also calibrated. First, a zeroGCount at Cal is measured by setting the load cells to zero degrees by measuring the angle with a calibration reference and adjusting the angle with truck hydraulics until it is at zero degrees. The accelerometer A-D counts are then taken, and this output is stored as the value ZeroG count at cal. G per count at cal is then determined. The accelerometer output counts are measured with the forks up (−1 G) and down (1 G). The Gpercount at cal is determined using these two values as follows:

$$G \text{ per count at cal} = \frac{(+1G - (-1G))}{(1wG\text{count} - (-1G\text{count}))} \quad (4)$$

This value is stored and used during weight measurement to convert the measured A-D accelerometer count to the G level seen by the accelerometer.

Preferably, a memory chip 100 is embedded in each load cell, and the accelerometer also has a built-in memory chip 102. This allows factory calibration of the load cell and accelerometer. It also permits the truck computer to read information and run system diagnostics. Each memory chip includes the serial number of the particular component and the factory calibration information. This enables trouble shooting and initial weight measurements to be run on installation of the load cells and accelerometer on a trash truck.

Figure 8B:
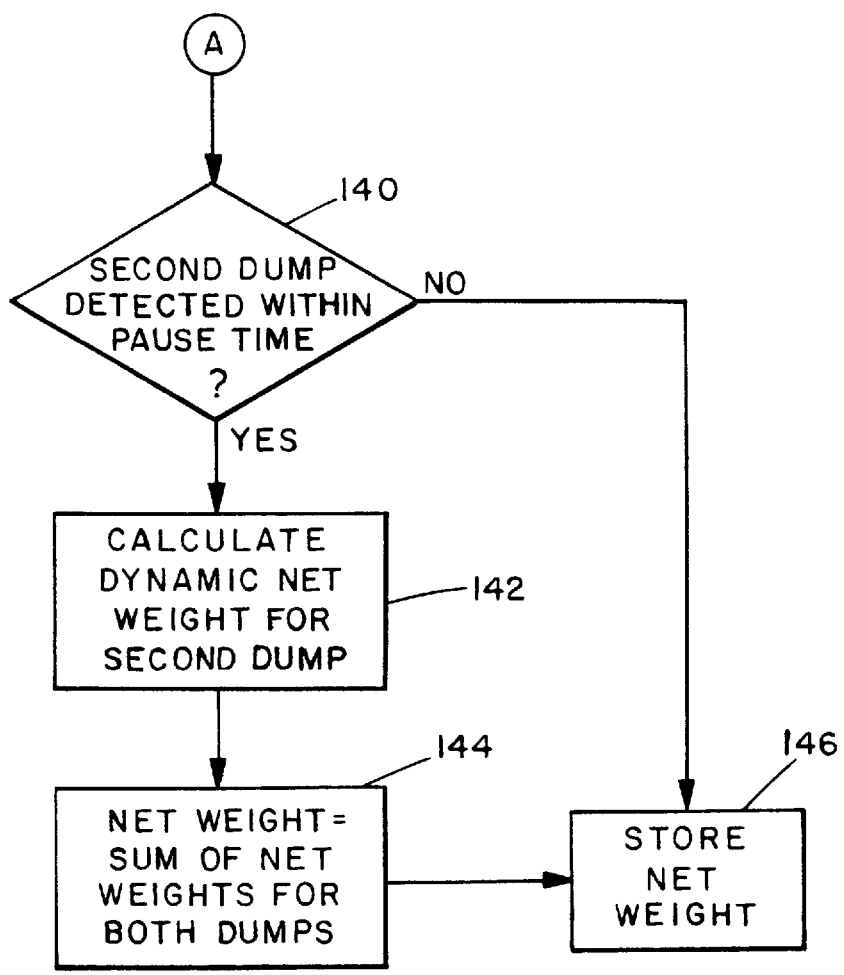
FIG. 8 is a flow chart of the weight calculation process.

The calibration values are stored in the truck computer and used in each weight computation, as best illustrated in FIGS. 8A and 8B, which schematically illustrate a flow diagram of the weight computation. As illustrated in FIG. 6, the load cell and accelerometer outputs are connected via an analog to digital converter and a filter to the central processing unit 30. The filter is a digital noise filter of the type used in the Waversaver weighing scale available from Hardy Instruments of San Diego, Calif. This filters noise resulting from vibrations and the like from the sensor outputs. The frequency of noise signals is typically higher than the frequency of the weight and acceleration signals. The filter passband can be set to exclude noise signals and transmit the filtered signal to the computer.

Filtered sensor output signals are transmitted at predetermined intervals to the computer. As illustrated in FIG. 8A, at the start of each trash can lifting and emptying cycle, the can RF ID tag is read and stored (step 70). Next, the system looks for engagement of switch 46, indicating that the lifting arm is at a predetermined angle (step 71). When the switch is engaged, load cell and accelerometer readings are read and stored (steps 72, 73 and 74). Readings are also taken and stored during the down cycle, with the system looking for the point at which the switch 46 is disengaged (see FIG. 10). The stored readings are used in step 75 to calculate a dynamic weight for each of N stored readings during the up cycle after switch engagement and N stored readings during the down cycle prior to switch disengagement. The weight calculation is illustrated in more detail in FIG. 9. A net up and down weight is calculated from the stored weight calculation for each of N readings in the up and down cycle, in steps 76 and 77. The dynamic net weight is calculated in step 78 by subtracting the net down weight from the net up weight.

Figure 9:
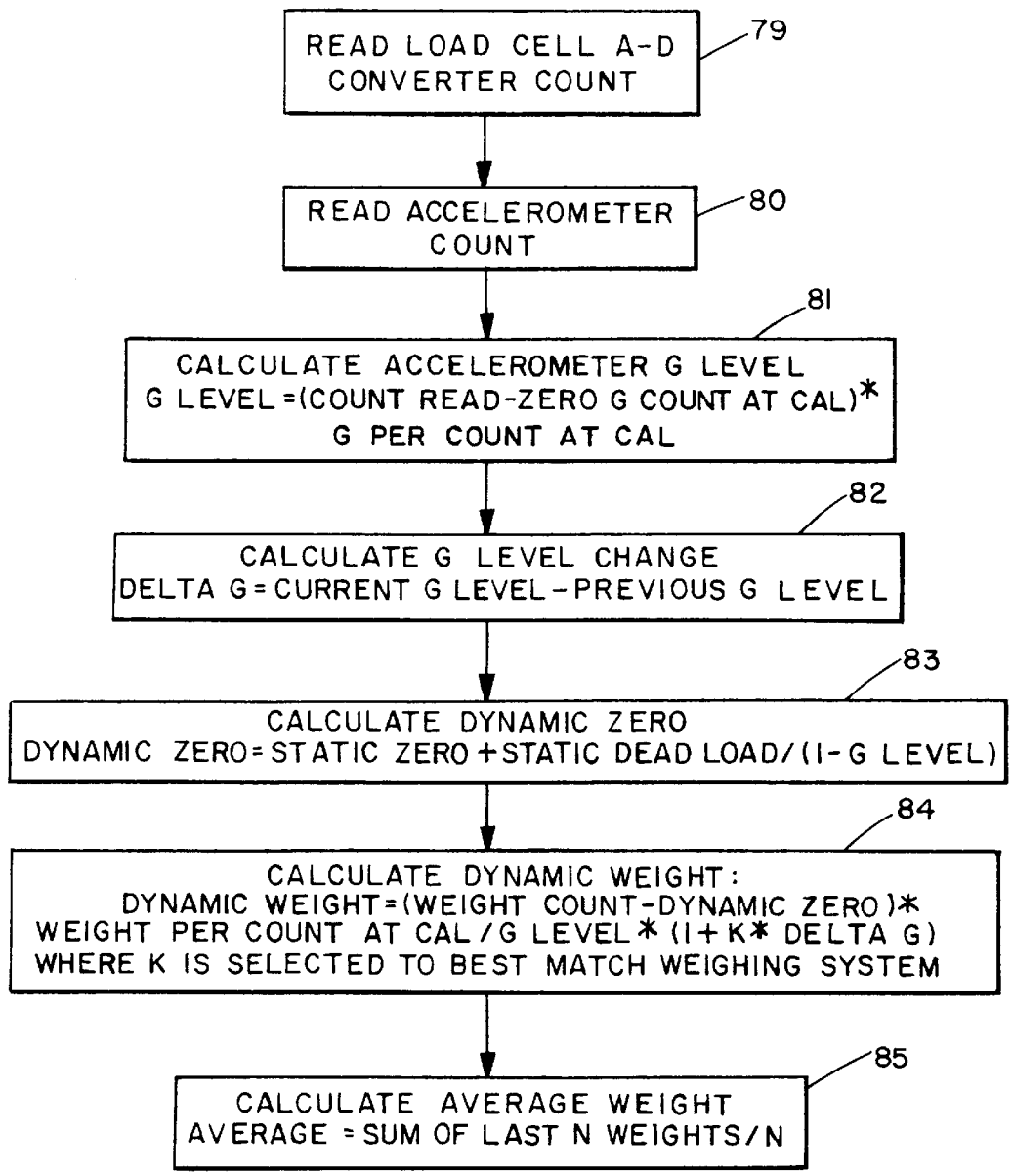
FIG. 9 is a flow diagram of the weight calculation sequence.
Figure 10:
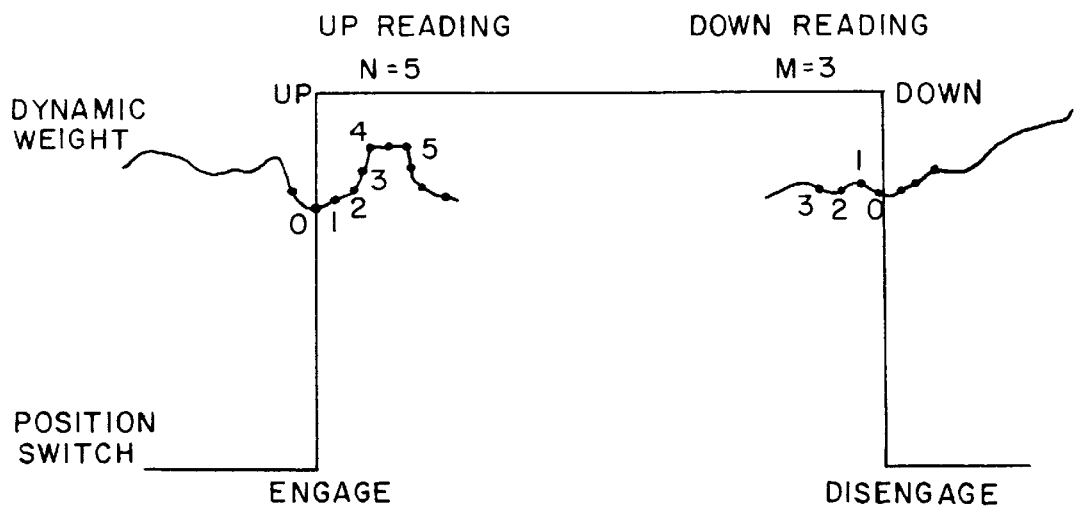
FIG. 10 is a graph of the dynamic weight variation during the fork raising and lowering operation.

The weight calculation illustrated in FIG. 9 is made for each filtered load cell and accelerometer output signal. First, the load cell output count is read at step 79. Next, the accelerometer output count is read (80). The accelerometer G level is then calculated (81) according to the following relationship:

$$G \text{ level} = (\text{Counts read} - \text{zero G count}) * G \text{ per count at cal}, \quad (5)$$

where "Counts read" is the accelerometer count from step 80, zero G count is the calibration count reading from the accelerometer with the forks at 0°, and G per count at calibration is the conversion factor computed during the calibration stage, as described above, for converting number of counts to the actual acceleration.

The change in G level, δG, is determined in step 82 by subtracting the previous G level from the G level determined at step 81.

The accelerometer reads the gravitational force in the same direction and orientation as the accelerometer. As the accelerometer is tilted, the G level read by the accelerometer will fall because of the angle, with the gravitational force dropping off as the cosine of the angle. The load cell weight also drops off as the cosine of the angle. This enables the accelerometer output to be used to compensate for the angle of the load cell. The change in G level also provides an indication of the speed.

Dynamic zero is then calculated at step 83 according to the following relationship:

$$\text{Dynamic zero} = \text{Static zero} + \frac{\text{Static DeadLoad}}{(1 - G \text{ level})} \quad (6)$$

where the G level is determined in step 82 and Static Zero and Static DeadLoad are both values determined during calibration, as described above. Dynamic zero is the expected A-D counts for zero load at a given angle. Thus, the difference between this and the actual counts provides a measure of the load on the arms. The dynamic weight can then be calculated (step 84) from the following relationship:

$$\text{Dynamic Weight} = (\text{Weight count} - \text{Dynamic zero}) * \frac{\text{Weight per count at cal}}{G \text{ level} * (1 + K * \delta G)}, \quad (7)$$

where "Weight count" is the actual output of the load cells, and Weight per count at cal and K are both values determined during calibration.

The average weight is then calculated at step 85, where $$\text{Average} = \frac{\text{Sum of last } N \text{ weights}}{N} \quad (8)$$

In the above example, the stored samples after the switch is engaged and prior to switch disengagement are used to compute the dynamic weight. Switch engagement and disengagement corresponds to a predetermined angle of the lifting forks, preferably around 40°. The angular position is selected to be at a point where the arm movement is normally relatively steady, i.e. at an intermediate point in raising and lowering the arm, prior to slowing down the arm which results in deceleration forces which will affect the sensor output.

In practice, a truck operator may lift and invert a container more than once, particularly where it appears there may be some material still stuck in the container after the first lifting and lowering container cycle. Preferably, the system is programmed to detect such "double dumps" and to compute the weight based on the sum of the two weights calculated in such cases. Without such an arrangement, the system would treat the two weights as separate collections. As indicated in FIG. 8, after a first dynamic net weight is calculated during a first lifting and lowering cycle, the system is programmed to detect whether a second dump occurs within a predetermined time, e.g. five seconds (step 140). This would indicate that the same container or can was being lifted and inverted a second time, i.e. a so-called double dump. If no second dump of the same container is detected, the system returns to a start condition ready for the next collection site. If a second dump is detected within the predetermined time interval, the system assumes the same container is being lifted, and carries out a second set of computations according to the same steps 72–78 to determine a second net weight dumped from the container (142). The first and second net weights are then added together (144) and the sum of these weights is stored as the weight of material collected at that site (146). This avoids potential billing problems where a customer sees two sets of weights for the same pick up and assumes that an error has occurred.

In an alternative arrangement, the accelerometer mazy be replaced with an angle sensor or inclinometer, since the G level when the forks are stationary is dependent on the fork angle θ. The voltage output of the angle sensor is proportional to the fork angle θ, and cos θ is proportional to the G level (which will be 1 G when the forks are vertical). Thus, a static G level can be calculated based on the sensed angle, and can be used in equation (7) above to determine the dynamic weight.

In an alternative embodiment, instead of using the output of switch 46 to decide which sensor outputs to use, the weight or load cell readings are used during the period when the G level is at or close to 1 G, both as the trash can is raised and as the emptied can is lowered. This is preferred to the above system relying only on switch 46, since it will provide more accurate results. However, if no G level close to 1 G is measured, the switch 46 is instead used as described above to determine which readings are used to compute the dynamic weight.

This arrangement permits accurate measurement of the weight of trash dumped while operating the lifting forks normally, without having to stop while readings are taken. Compensations are made for G forces and acceleration forces, and unwanted vibration and noise is filtered from the signal prior to computing the weight.

The accelerometer may also be used to determine whether the forks are folded up when positioned on top of the truck after an emptied can has been returned to the ground, as illustrated in FIG. 11. This procedure may be carried out at the end of each can emptying cycle, as the truck is driven off to the next site. The accelerometer output is first measured (86). When the forks are stationary in the down position, a G level of close to 1 G should be measured. If an acceleration close to 1 G is detected (step 88), the routine ends since the forks are down (90). If the G level is not close to 1 G, but is close to −1 G (step 92), this indicates that the forks are up and folded, and the routine ends at 94. However, if the measured G level is not near to either 1 G or −1 G, typically within around 95% of ±1 G, when the forks are stationary, an alarm is actuated (96) indicating that the forks are up and not folded. If the forks are not folded and the truck is driven, the forks may hit trees or bridges and cause extensive damage. This system permits the driver to be notified immediately if the forks are not correctly folded, avoiding such problems.

Figure 12:
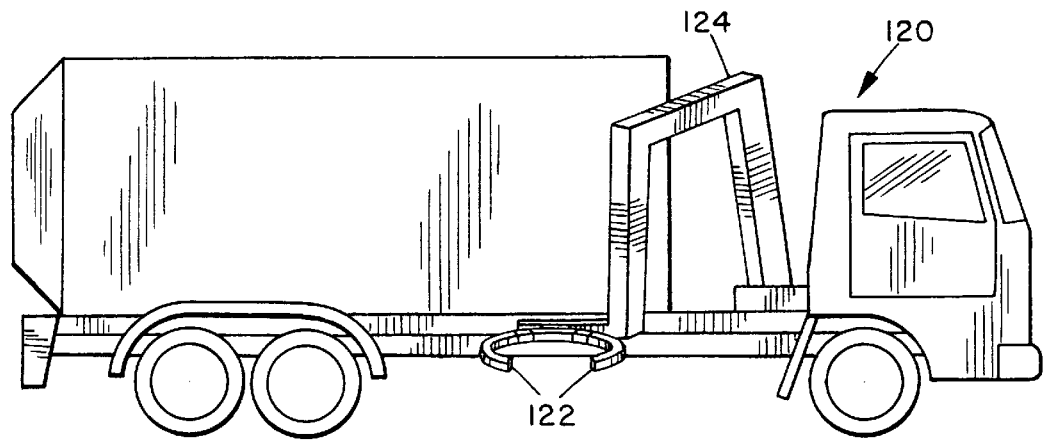
FIG. 12 is a side elevation view of a typical side loading refuse collection vehicle.
Figure 13:
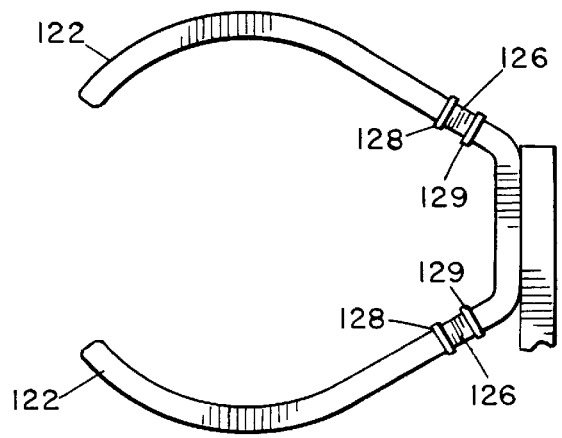
FIG. 13 is an enlarged top plan view of the side pick-up fork, showing the load cell locations.

The refuse weighing system has been described above in connection with a front end loading trash truck. However, it will be understood that an equivalent system may be utilized with other types of trash truck, such as a side loading refuse truck 120 as illustrated in FIGS. 12 and 13, or a rear end or side end loader (not illustrated) of a tipper fashion loading device. Side loading refuse trucks 120 have generally C-shaped forks or claws 122 for gripping around a refuse container. The claws 122 are secured to a suitable lifting arm 124 for raising and lowering the container, as is well known in the field. Load cells 126 are installed on the claws 122 in a similar manner to load cells 18 of the first embodiment, by cutting the claw at a location close to the connection to lifting arm 124 and installing the load cell 126 between the cut ends of the claw via mounting plates 128,129. The weighing system in this embodiment will otherwise be identical to the system as described above in connection with FIGS. 1–11.

The host computer 42 at the waste collection company facility will have stored data including a list of customer names and addresses and the corresponding trash can serial numbers and RFID numbers. Customers will be grouped into routes and subroutes. Truck ID numbers and driver names are also loaded, and each truck may be assigned to a particular route. Each day, new routes will be generated and assigned to trucks. The route is a list of stops which need to be picked up that day. It may also include any stops which were missed on the previous day. The list is transferred to the respective truck either by means of a computer disk or memory card, or via radio link.

The data stored in the host computer also preferably includes customer complaints, stolen or damaged carts, cancelled or slow paying accounts, cart location notes (for hard to find carts), collection notes, truck payload limits, and so on. All this information for a particular route will also be transferred to the truck computer of the truck assigned to that route. This will enable much better service than was previously possible.

At the start of each working day, the driver enters his or her name via the keypad on the driver display panel. The truck ID number is automatically entered. From that point on, all data collected during the day will be associated with that truck and driver. As described above, at each stop the driver will control the lifting arm to engage a trash can, lift it up and invert it to deposit the trash into the truck, and then lower it back to the ground. During lifting and lowering, the weighing procedure is carried out automatically as described above. The deposited weight of trash is displayed on the display panel and also stored in the memory along with the time of the dump. The total weight dumped into the truck is also computed and displayed, so that the driver is aware when the truck is approaching its payload limit. The collected data may also be simultaneously transmitted to the host computer via radio link. Other route events are also entered by the driver, such as damaged cans, driver breaks, traffic delays, or blocked access to cans.

Because the weighing occurs while the cans are in motion, the driver can work just as fast as with a system without any weighing, yet the customers can be billed more accurately based on weight of trash collected. Weighing while the cans are in motion is made possible by using an accelerometer to compensate for factors which might affect the detected weight, such as acceleration, G forces and the like, as well as the use of filters to filter out noise in the load cell and accelerometer output signals due to vibration from truck and engine noise. The driver sees the weight of trash deposited at each stop, and can make a judgement call as to whether the scale appears to be working correctly. If the weight does not appear to be accurate, the driver can push a "Weight Error" button to mark the data as suspect. If multiple suspect weights are detected, the driver contacts the central office for instructions. The driver can also push a "Damaged Cart" button at the display panel keypad if a damaged cart is noticed, and this data will be associated with the site address and transmitted to the host computer. The address will then be included on a "Damaged Cart" report for maintenance crews to fix. If the driver has noted that access to the can or container is blocked at a particular address, the customer can be notified and asked to place the can in an accessible position on the next pick-up day.

Another option is a "Misplaced Cart" button for actuation by a driver if the customer has positioned the cart incorrectly for pick up. The customer can then be notified so that the cart will be positioned correctly next time. Additionally, a number of cities have a curbside recycling program, where customers sort and collect recyclable materials. In some cases, these materials are bagged and put in the truck along with refuse, to be sorted out later. In this case, a "Recycle" button is provided on the driver's keypad, so that reports can be generated as to which households are making an effort to recycle materials.

After data collection is completed for the day, the stored data is transferred to the host computer, preferably using a memory card or disk. Alternatively, it may be transferred via radio link, although this will be more expensive. The collected data is then processed by the host computer to produce billing based on weight or pickups. The host computer is also programmed to generate various types of reports, such as can weight, driver productivity, customer history, and can history. Stolen cart reports can also be generated, based on truck detection of a stolen cart RFID number. Crews can then be sent out to retrieve detected stolen carts. Any customer complaints are also entered in the host computer, and are transferred to the appropriate truck computer on that customer's route for display to the driver. This allows the driver to see customer feedback as the trash is actually being collected.

The same system can be used both to weigh trash and recycling materials collected in a curbside recycling program. A record can then be kept of a customer's recycling activity, and they may be credited based on the amount of material recycled.

In the system described above, the weight of a container is determined during the lifting cycle, without having to stop the lifting arm as the container is lifted and lowered in order to take a static load cell output. However, the same system may alternatively be used for static weighing, if desired. In this case, the accelerometer or angle sensor is used to determine the static G level as the load cell output is taken after stopping the arm. The position at which the arm is stopped to take a load cell reading may be determined by the operator, or by a suitably positioned switch so that the up and down readings are taken at the same angle. The operator may alternatively stop the arm as soon as the container is lifted from the ground, and again just before it is returned to the ground after emptying. The weight reading or load cell output is then divided by the G level to provide a corrected net weight. The down or tare weight is then subtracted from the gross weight to produce a net weight.

In the method described above in connection with FIGS. 1–10, the loadcell output is measured at an angle while the contents of a can are being dumped. The weight at an angle is then corrected using the accelerometer output. In an alternative method, instead of using the absolute weight and acceleration readings to calculate the net weight, the change in acceleration and weight at two different positions in both the lifting and lowering cycle is used to calculate the weight. This method has the advantage of being immune to changes in bias reading of the load cell and accelerometer, which helps avoids errors as a result of temperature changes and drift.

In the alternative method, two different points are selected to measure load cell and accelerometer output. These points may be determined by multiple switches, for example, with the readings being taken when each switch opens and closes. Alternatively, a single switch may be used with readings taken at the point where the switch opens and closes and at a calculated distance from that point, for example. Assuming the load cell readings during the up cycle are WT1 and WT2, respectively, and the accelerometer outputs are A1,A2, the gross weight is calculated as follows:

$$\text{Dynamic Gross Weight} = \frac{WT_1 - WT_2}{A_1 - A_2} - \text{Static Deadload} \qquad (9)$$

Similarly, the weight at positions 3 and 4 during the down cycle is WT3 and WT4, and the accelerometer output or G level is A3,A4, and the tare weight is calculated as follows:

Dynamic Tare Weight (emptied container) = (10)

$$\frac{WT_4 - WT_3}{A_4 - A_3} - \text{Static Deadload}$$

The weight deposited in the container can then be calculated by subtracting the second weight from the first weight.

The material weighing system of this invention allows the weight of deposited trash or recycling material received from a customer's can to be measured and stored quickly, accurately and easily during a truck driver's normal collecting procedure. By mounting the load cells along the length of the actual lifting forks, a more accurate measurement of the lifted weight can be obtained. Additionally, the use of an accelerometer at approximately the same distance from the lifting arm pivot as the load cells allows the measured load to be compensated for factors such as truck incline, fork angle, can acceleration and centrifugal force. The use of filters to filter noise from the sensor outputs is also critical in filtering out noise due to truck shaking and vibration during the dynamic measurement, which would otherwise introduce significant errors.

Although some preferred embodiments of the invention have been described above by way of example only, it will be understood by those skilled in the field that modifications may be made to the disclosed embodiments without departing from the scope of the invention, which is defined by the appended claims.

We claim:

1. A weighing system for a refuse or recycling truck, comprising:

a lifting arm movably secured to the truck at one end and having lifting forks at an opposite end having lifting portions for engaging a container, the lifting arm being movable between a lower position for engaging a container, a raised position for depositing material from the container into the truck, and back to the lowered position to release the emptied container;

a load cell incorporated into each lifting fork for detecting the load carried by the lifting fork and providing an output signal proportional to the load;

each fork comprising an elongate member and the associated load cell being installed along the length of the elongate member in line with the fork at a location spaced rearwardly from said lifting portion whereby a container does not directly engage said load cells;

at least one acceleration sensor on the lifting arm for sensing G level on the arm and producing an output proportional to the sensed forces;

a processing unit connected to the load cell and acceleration sensor outputs for receiving the output signals of the load cells and acceleration sensor at least for a predetermined time period as the arm is raised and for the same time period as the arm is lowered; and the processing unit including means for compensating the load cell output signals for acceleration forces and inclination of the lifting arm, means for calculating the dynamic gross weight carried by the lifting forks as a container is raised and means for calculating the tare weight as the same container is lowered after emptying for each set of sensor outputs, and means for calculating the net weight of material deposited into the truck from the container based on the calculated dynamic weights.

2. The system as claimed in claim 1, including a switch and an actuator for engaging the switch at a predetermined position during raising the arm and disengaging the switch at a corresponding position during lowering the arm, the switch output being connected to said processing unit, the processing unit further including means for using a predetermined number of sensor outputs after engagement of the switch to calculate the dynamic gross weight of the container and contents and using an equivalent number of sensor outputs prior to disengagement of the switch to calculate the dynamic tare weight of the emptied container.

3. The system as claimed in claim 2, wherein the switch is positioned for engagement by the actuator when the lifting arm is at a predetermined angle to the horizontal.

4. The system as claimed in claim 1, wherein the processing unit includes means for computing the G force level on the arm for each set of sensor outputs, means for determining when the G level is at a predetermined level as the arm is lifted and using the corresponding sensor outputs to calculate the dynamic weight of the container and contents when the G level is at the predetermined level, means for determining when the G level is approximately 1 G as the arm is lowered and using the corresponding sensor outputs to calculate the dynamic weight of the emptied container only while the G level is at the predetermined level.

5. The system as claimed in claim 1, including a first filter between the load cells and the processing unit and a second filter between the accelerometer and the processing unit, the filters comprising means for filtering noise from the sensor output signals.

6. The system as claimed in claim 5, wherein the filters are digital filters.

7. The system as claimed in claim 1, wherein the load cells and accelerometer are all located at approximately the same distance from said one end of the lifting arm.

8. The system as claimed in claim 1, wherein said load cells and acceleration sensor each have an embedded memory chip, each memory chip having stored information including a part identification number for maintenance purposes.

9. The system as claimed in claim 1, wherein each fork has a cut along its length forming opposing cut ends, and the load cell being mounted between the cut ends of the fork.

10. The system as claimed in claim 9, including at least one overload bolt extending across each load cell, the overload bolt being rigidly linked to one cut end of the fork and being connected to the opposing cut end with a predetermined amount of free play, whereby the overload bolt forms a rigid connection bypassing the load cell if loads above a predetermined level are placed on the fork.

11. The system as claimed in claim 10, wherein the predetermined load level is in the range from 10,000 to 17,500 lbs.

12. The system as claimed in claim 10, including two overload bolts extending across each load cell.

13. The system as claimed in claim 1, including a storage unit for storing the net weight of material deposited along with customer identification information, a remote host computer including stored information on customer names and addresses and collection routes, and a transfer device for transferring stored information from a truck processing unit to the host computer, and the host computer including processing means for generating customer invoices based on the deposited weight information for respective customers.

14. The system as claimed in claim 13, wherein the truck processing means includes means for receiving and storing information from a truck driver on damaged or missing containers at any collection site, and the processing means of the host computer includes means for generating missing and lost can reports.

15. The system as claimed in claim 14, wherein the truck processing unit includes means for operator entry of information regarding any collection site where access to a container is blocked, and the host computer processing means includes means for generating a report for notifying a customer in the event that access to the customer's container was blocked.

16. The system as claimed in claim 13, wherein the host computer includes means for receiving and storing customer complaints, means for generating collection routes for a plurality of trucks, including any customer complaints associated with any collection site on a route, and means for transferring each route and any associated customer complaints to a respective truck processing unit.

17. The system as claimed in claim 1, including a display unit for mounting in a truck to display the calculated net weight of material deposited from each container on a route.

18. A weighing system for a refuse or recycling truck, comprising:

a lifting arm movably secured to the truck at one end and having lifting forks at an opposite end for engaging a container, the lifting arm being movable between a lower position for engaging a container, a raised position for depositing material from the container into the truck, and back to the lowered position to release the emptied container;

a load cell incorporated into each lifting fork for detecting the load carried by the lifting fork and providing an output signal proportional to the load;

at least one acceleration sensor on the lifting arm for sensing G level on the arm and producing an output proportional to the sensed forces;

a processing unit connected to the load cell and acceleration sensor outputs for receiving the output signals of the load cells and acceleration sensor at least for a predetermined time period as the arm is raised and for the same time period as the arm is lowered;

the processing unit including means for compensating the load cell output signals for acceleration forces and inclination of the lifting arm, means for calculating the dynamic gross weight carried by the lifting forks as a container is raised and means for calculating the tare weight as the same container is lowered after emptying for each set of sensor outputs, and means for calculating the net weight of material deposited into the truck from the container based on the calculated dynamic weights; and the processing unit further comprising means for receiving the accelerometer output when the lifting arm is up and stationary, means for determining whether the forks are folded or non-folded based on the detected G level, and means for producing an alarm signal to notify the driver if the forks are not folded.

19. A method of calculating the net weight of material deposited from a refuse or recycling container into a refuse or recycling truck, comprising the steps of:

installing a load cell along the length of at least one lifting fork of a truck lifting arm at a location spaced rearwardly of a container contacting portion of the arm such that the load cell does not contact a container during lifting;

providing a first series of output signals from the load cell at predetermined intervals as the lifting fork is raised with a loaded container and a second series of output signals at predetermined intervals as the fork is lowered with the emptied container;

providing a third series of output signals from at least one angle sensing device installed on the lifting arm as the arm is raised and lowered;

using the output signals from the angle sensing device to correct the load cell output signal for fork angle;

calculating a first dynamic gross weight of the container and contents as the lifting fork is raised using the corrected load cell outputs from a predetermined portion of the lifting cycle;

calculating a second dynamic tare weight of the emptied container as the lifting fork is lowered using the corrected load cell outputs from a predetermined portion of the lowering cycle;

subtracting the second tare weight from the first gross weight to determine the net weight of material deposited in the refuse truck;

storing the computed deposited material net weight; and repeating the procedure for each container emptied along a truck collection route.

20. A method of calculating the net weight of material deposited from a refuse or recycling container into a refuse or recycling truck, comprising the steps of:

installing a load cell along the length of at least one lifting fork of a truck lifting arm;

providing a first series of output signals from the load cell at predetermined intervals as the lifting fork is raised with a loaded container and a second series of output signals at predetermined intervals as the fork is lowered with the emptied container;

providing a third series of output signals from at least one angle sensing device installed on the lifting arm as the arm is raised and lowered;

using the output signals from the angle sensing device to correct the load cell output signal for fork angle;

calculating a first dynamic gross weight of the container and contents as the lifting fork is raised using the corrected load cell outputs from a predetermined portion of the lifting cycle;

calculating a second dynamic tare weight of the emptied container as the lifting fork is lowered using the corrected load cell outputs from a predetermined portion of the lowering cycle;

computing the G level for each load cell output signal based on the output of the angle sensing device as that signal is taken, determining if the G level is close to 1 G, and using the load cell output signals corresponding to periods when the G level is close to 1 G to calculate the first and second dynamic weights;

subtracting the second tare weight from the first gross weight to determine the net weight of material deposited in the refuse truck;

storing the computed deposited material net weight; and repeating the procedure for each container emptied along a truck collection route.

21. The method as claimed in claim 20, further including the steps of detecting when the orientation of the lifting arm is close to a predetermined angle as the arm is raised and lowered, and using a predetermined number of load cell output signals after the arm reaches that orientation during the lifting cycle to calculate the first dynamic gross weight, and using a corresponding number of load cell output signals prior to the arm reaching the predetermined orientation in the lowering cycle to calculate the second dynamic tare weight if the detected G level is not determined to be close to 1 G at any time during the lifting and lowering cycles.

22. The method as claimed in claim 19, wherein the angle sensing device comprises at least one accelerometer.

23. The method as claimed in claim 22, including the steps of detecting the accelerometer output signal when the forks are stationary after a container has been emptied and returned to the ground, determining the G level from the accelerometer output signal, and producing an alarm if the G level is not approximately equal to 1 G.

24. The method as claimed in claim 19, including the steps of loading a truck pick up route on a memory card, installing the memory card on a memory card reader in a truck computer, and displaying the route to the driver of the truck, storing the computed deposited weight for each stop on the route on the memory card, transferring the memory card to a host computer at the end of the route, and using the stored weights on the memory card to generate invoices based on deposited weight for each customer on the route.

25. A method of calculating the net weight of material deposited from a refuse or recycling container into a refuse or recycling truck, comprising the steps of:

installing a load cell along the length of at least one lifting fork of a truck lifting arm;

providing a first series of output signals from the load cell at predetermined intervals as the lifting fork is raised with a loaded container and a second series of output signals at predetermined intervals as the fork is lowered with the emptied container;

providing a third series of output signals from at least one angle sensing device installed on the lifting arm as the arm is raised and lowered;

using the output signals from the angle sensing device to correct the load cell output signal for fork angle;

calculating a first dynamic gross weight of the container and contents as the lifting fork is raised using the corrected load cell outputs from a predetermined portion of the lifting cycle;

calculating a second dynamic tare weight of the emptied container as the lifting fork is lowered using the corrected load cell outputs from a predetermined portion of the lowering cycle;

subtracting the second tare weight from the first gross weight to determine the net weight of material deposited in the refuse truck;

storing the computed deposited material net weight;

repeating the procedure for each container emptied along a truck collection route; and detecting if the same container is raised and emptied a second time at a single collection site, determining a second net weight of material dumped from the container during a second lifting and lowering cycle if a second dump of the same container is detected, and adding the second net weight to the first mentioned net weight to determine the total weight of material dumped from the container, and storing the total weight.

26. The method as claimed in claim 25, wherein the step of detecting a second dump from the same container comprises detecting a second raising and lowering cycle within a predetermined time period after an initial raising and lowering cycle, and adding the net weight to the previously determined net weight if a second raising and lowering cycle is detected within said predetermined time period.

27. The method as claimed in claim 19, wherein the step of calculating the first dynamic gross weight comprises the steps of taking load cell and sensing device outputs at at least two different positions in the lifting cycle, and using the difference between the two sets of outputs to determine the first dynamic gross weight, and the step of calculating the second dynamic tare weight comprises the steps of taking the load cell and sensing device outputs at at least two different positions in the lowering cycle and using the difference between the two sets of outputs to determine the second dynamic tare weight.

28. A weighing system for a material collecting truck for collecting materials from containers at a plurality of collection sites, the system comprising:

a lifting arm movably mounted on the truck at one end and having lifting forks at the opposite end for engaging a container, the lifting arm being movable in a lifting cycle between a lower position for engaging a container and a raised position for depositing material from the container into the truck, and movable in a lowering cycle from the raised position back to the lower position to release the emptied container;

a load cell incorporated into each lifting fork for detecting load carried by the lifting fork and providing a first output signal proportional to the load;

at least one angle sensor on the lifting arm for producing a second output signal proportional to the angle of the lifting forks;

a processing unit connected to the load cell and angle sensor outputs for receiving a first set of first and second output signals at at least one predetermined position of the lifting arm prior to emptying a lifted container and receiving a second set of first and second sensor outputs at at least one predetermined position of the lifting arm prior to release of the emptied container; and the processing unit including means for calculating a first gross weight of the container and contents using the first set of output signals, means for calculating the tare weight of the emptied container using the second set of sensor output signals, the means for calculating the gross and tare weights comprising means for determining the G level from the angle sensor output, means for determining a weight on the lifting fork from the load cell output, and means for dividing the determined weight by the determined G level, and means for calculating the net weight of material deposited from the container into the truck by subtracting the tare weight from the gross weight.

29. The system as claimed in claim 28, wherein the first and second sets of sensor outputs are taken while the lifting arm is stationary.

30. The system as claimed in claim 28, wherein the first and second sets of sensor outputs are taken while the lifting arm is moving.

31. The system as claimed in claim 28, including a plurality of angle sensors.

32. A weighing system for a material collecting truck for collecting materials from containers at a plurality of collection sites, the system comprising:

a lifting arm movably mounted on the truck at one end and having lifting forks at the opposite end for engaging a container, the lifting arm being movable in a lifting cycle between a lower position for engaging a container and a raised position for depositing material from the container into the truck, and movable in a lowering cycle from the raised position back to the lower position to release the emptied container;

a load cell incorporated into each lifting fork for detecting load carried by the lifting fork and providing a first output signal proportional to the load;

a plurality of angle sensors on the lifting arm for producing a second output signal proportional to the angle of the lifting forks, each angle sensor comprising an accelerometer;

a processing unit connected to the load cell and angle sensor outputs for receiving a first set of first and second output signals at at least one predetermined position of the lifting arm prior to emptying a lifted container and receiving a second set of first and second sensor outputs at at least one predetermined position of the lifting arm prior to release of the emptied container; and the processing unit including means for calculating a first gross weight of the container and contents using the first set of signals, means for calculating the tare weight of the emptied container using the second set of sensor outputs, and means for calculating the net weight of material deposited from the container into the truck by subtracting the tare weight from the gross weight.

33. A method of calculating the net weight of material deposited from a container into a collection truck, comprising the steps of:

installing a load cell along the length of at least one lifting fork of a truck lifting arm;

engaging and lifting a container from the ground on the lifting arm in a lifting cycle up to a raised, inverted position to deposit material from the container into the truck;

providing at least one first output signal from the load cell at at least one predetermined position in the lifting cycle;

providing at least one second output signal from an angle sensing device at said one predetermined position;

calculating a first gross weight of the container and contents using said first and second output signals;

lowering the container from the raised, inverted position back to the ground in a lowering cycle;

providing at least one third output signal from the load cell at at least one predetermined position in the lowering cycle;

providing at least one fourth output signal from the angle sensing device at said predetermined position in the lowering cycle;

calculating a second tare weight of the emptied container from the third and fourth output signals;

the steps of calculating the first gross weight and the second tare weight each comprising determining the G level from the angle sensor output, determining a weight carried on the lifting fork from the load cell output, and dividing the determined weight by the determined G level;

subtracting the second tare weight from the first gross weight to determine the net weight of material deposited in the truck;

storing the computed net weight; and repeating the procedure for each container emptied along a collection route.

34. The method as claimed in claim 33, wherein the lifting arm is stopped at said predetermined positions in the lifting and lowering cycles as said output signals are taken.

35. The method as claimed in claim 33, wherein said output signals are taken as the arm is moving in both said lifting and lowering cycles.

36. The method as claimed in claim 33, wherein two sets of output signals are provided from the load cell and angle sensing device at two different positions in both the lifting cycle and the lowering cycle, and the gross weight and tare weight are calculated based on the difference between the two sets of readings.

* * * * *